(12) United States Patent
Roh

(10) Patent No.: US 6,967,912 B1
(45) Date of Patent: Nov. 22, 2005

(54) METHOD AND APPARATUS FOR DETERMINING A RECORDABLE POSITION OF A WRITABLE DISK

(75) Inventor: Jin-Tae Roh, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 612 days.

(21) Appl. No.: 09/662,808

(22) Filed: Sep. 15, 2000

(30) Foreign Application Priority Data

Sep. 16, 1999 (KR) .................................. 99-39944

(51) Int. Cl.⁷ .............................................. G11B 7/00
(52) U.S. Cl. ............................... 369/47.38; 369/53.31; 369/53.41
(58) Field of Search .......................... 369/47.38, 53.12, 369/53.15, 53.31, 53.36, 53.41, 47.44, 44.74, 369/53.13

(56) References Cited

U.S. PATENT DOCUMENTS

| | | | | |
|---|---|---|---|---|
| 4,402,061 A | * | 8/1983 | Hazel et al. ............. | 369/275.3 |
| 4,631,706 A | * | 12/1986 | Batalden et al. ............ | 365/215 |
| 5,255,270 A | * | 10/1993 | Yanai et al. ................. | 714/710 |
| 5,341,356 A | * | 8/1994 | Dieleman et al. ......... | 369/47.54 |
| 5,526,331 A | * | 6/1996 | Park et al. ................ | 369/47.12 |
| 5,563,862 A | * | 10/1996 | Udagawa ................. | 369/53.24 |
| 5,623,470 A | * | 4/1997 | Asthana et al. .......... | 369/47.49 |
| 5,721,856 A | * | 2/1998 | Takeuchi ........................ | 711/1 |
| 5,825,726 A | * | 10/1998 | Hwang et al. ........... | 369/30.05 |
| 6,134,204 A | * | 10/2000 | Taugher .................... | 369/59.25 |
| 6,327,228 B1 | * | 12/2001 | Tani ......................... | 369/30.18 |
| 6,363,040 B1 | * | 3/2002 | Murata ....................... | 369/47.1 |

* cited by examiner

*Primary Examiner*—A M Psitos
(74) *Attorney, Agent, or Firm*—Birch, Stewart, Kolasch & Birch, LLP

(57) ABSTRACT

The present invention relates to method and apparatus for recording new data in a writable disk such as a once-writable disk CD-R and a rewritable disk CD-RW after previous recording to the disk is interrupted abnormally. A method of determining a recordable position of a writable disk according to the present invention, reads data recording information of the writable disk, examines whether or not an area after a recordable position indicated by the read data recording information has recorded data, and changes the recordable position to another position for new input data if the area has recorded data. Therefore, new data is always written after any uncompleted data track without being written over previously recorded data even if the recording information of an uncompleted data track is wrong or unusable. The method and apparatus for determining a recordable position of a writable disk according to the present invention, enable new data not to be overwritten onto previously recorded data whose recording was interrupted by a servo or writing failure caused from a mechanical shock. This allows new data to be recorded properly as well as prevents previously written data from being damaged or lost.

7 Claims, 10 Drawing Sheets

*Conventional Art*

Conventional Art

*Conventional Art*

Conventional Art

METHOD AND APPARATUS FOR DETERMINING A RECORDABLE POSITION OF A WRITABLE DISK

BACKGROUND OF THE INVENTION

1. Field of the Invention

The present invention relates to a method and apparatus for recording new data in a writable disk after a previous recording to the disk is interrupted abnormally.

2. Description of the Related Art

FIG. 1 is a simplified block diagram of a conventional optical disk device for recording and reproducing data to/from a writable disk such as an once-recordable disk CD-R and a rewritable disk CD-RW. The disk device of FIG. 1 comprises a digital recording signal processor 4b for converting input data into recording-formatted data by adding additional data such as error correction codes, a channel bit encoder 11 for converting the recording-formatted data into EFM-formatted bit stream, a writing driver 12 for yielding a writing current according to an input bit stream, an optical pickup 2 for recording signals corresponding to the writing current onto an optical disk 1 and reproducing recorded signals from the optical disk 1, an R/F unit 3 for yielding servo error signals TE and FE, and binary signals through combining the reproduced signals from the disk 1, a digital reproducing signal processor 4a for restoring original data from the binary signals, a sled motor 9 for moving the pickup 2 radially, a spindle motor 10 for rotating the disk 1, a driving unit 8 for driving the motors 9 and 10, a servo unit 5 for controlling the driving unit 8 and the pickup 2 based on the servo error signals TE and FE, a microcomputer 6 for controlling the overall operation of the servo unit 5, the digital signal processors 4a and 4b, and the writing driver 12 in order to record and reproduce data, and a memory 7 for storing data for the microcomputer 6 to use for supervising operations.

FIGS. 2 and 3 depict a recording area format and an example of recorded data for an once-recordable disk CD-R or a rewritable disk CD-RW. The writable disk is partitioned, as shown in FIG. 2, into a power calibration area (PCA), a program memory area (PMA), and one or more sessions, each consisting of a lead-in area, a program area, and a lead-out area.

The PCA is used for writing data experimentally to determine an optimal writing power, and the PMA is reserved for recording information such as position and size of each recorded track which is data group recorded continuously without stop. Each track recorded in the program area is separated by a pause section which is corresponding to about 2 second reproduction time.

The lead-in area has information on the next recording position, that is, a lead-in area position of the neighboring next session. Therefore, when data recording is requested, a final recording position, that is, the next recordable position is detected easily and quickly through reading the lead-in area of a last session which was closed before.

FIG. 4 is a flow chart illustrating a process of writing new data adjacently to previously-recorded data. The conventional data writing method of FIG. 4 to be conducted by the disk device of FIG. 1 is described.

When a user requests new data to be recorded in an inserted disk 1, the microcomputer 6 sets its mode to the recording mode (S10), conducts an optimal power calibration (OPC) by recording and reproducing test data to/from the PCA, and sets an optimal writing power determined through the OPC into the writing driver 12 (S11).

After that, the microcomputer 6 reads position and size information, which is recorded in the PMA, about recorded tracks (S12), and searches for the first lead-in area, the second lead-in area, and the third lead-in area, in turn based on the PMA information (S13). For example, suppose that tracks 1 and 2 belong to the first closed session, tracks 3 and 4 belong to the second closed session, and tracks 5 and 6 are recorded next to the second closed session as shown in FIG. 5. The microcomputer 6 reads out position information of the second lead-in area 'LIA2' from the first lead-in area 'LIA1', and reads the second lead-in area 'LIA1' to know the next recording position, that is, the position of track 5.

Since the program area containing the tracks 5 and 6 is not closed into a session (S14), the microcomputer 6 examines the PMA information to know how many tracks are recorded in the disk 1 (S15), and locates final recorded track 6 based on the PMA information (S16). Then, the microcomputer 6 controls the digital recording signal processor 4b and the servo unit 5 to record new data on an area separated by a pause section from track 6. If all of the new data are recorded, the microcomputer 6 designates just-recorded data block as track 7, creates information on the recorded position and size about the track 7 and writes it in the PMA (S17).

Some time later, if the tracks 5 to 7 are requested to be closed in a session (S18), the microcomputer 6 groups the tracks 5 to 7 into the third session, writes necessary information in the secured third lead-in area 'LIA3', and secures the third lead-out area 'LOA3' next to the last track (S19). After that, the above-explained recording operation will be conducted or not according to a user's request.

However, during the recording operation, a servo control may fail due to a mechanical shock or a data buffer may be underrun, which causes the current recording operation to stop abruptly without writing track information or lead-in information. Therefore, the PMA information may represent real-recorded tracks wrongly or the lead-in area may contain invalid information.

For a writable disk suffering from such a recording failure, it is impossible to detect the last recorded position accurately. As a result, new data may be overwritten onto previous data or unwritten area may arise between the last recorded track and the new recorded track. If previous data was overwritten by the new data, the previous data would be lost.

Especially, if the writable disk is once-writable one, the new recorded data as well as the previous data are damaged together when the previous data are overwritten since the surface is burned while recording and it can not be restored to the unburned state.

SUMMARY OF THE INVENTION

It is an object of the present invention to provide a method and an apparatus for determining a recordable position of a writable disk such as an once-recordable disk and a rewritable disk, which detect a recordable position from recording information, and verifies the detected recordable position to know whether or not it is the last position of actually-recorded data by examining the recorded state changed from written data.

A method of determining a recordable position of a writable disk according to the present invention, reads data recording information of the writable disk, examines whether an area after a recordable position indicated by the read data recording information has recorded data or not, and changes the recordable position to another position for new input data based on the examination result.

Another method of determining a recordable position of a writable disk according to the present invention, checks whether a previous recording has been done properly, examines a recording area affected by a writing beam during the previous recording according to the checked result, and determines a recordable position for new input data based on the examination result.

A disk recording/reproducing apparatus to which the above method according to the present invention is applied, includes a pickup for writing input data and reading the written data to/from a writable disk; a moving unit moving the pickup across the writable disk; and a controller controlling the moving unit to move the pickup, when recording of new data is requested, to a recordable position indicated by data recording information which was updated after a previous data recording, checking whether or not recorded data exists after the indicated recordable position by examining the state of a recording surface of the writable disk, and changing the recordable position for the new data to another position based on the checked result.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
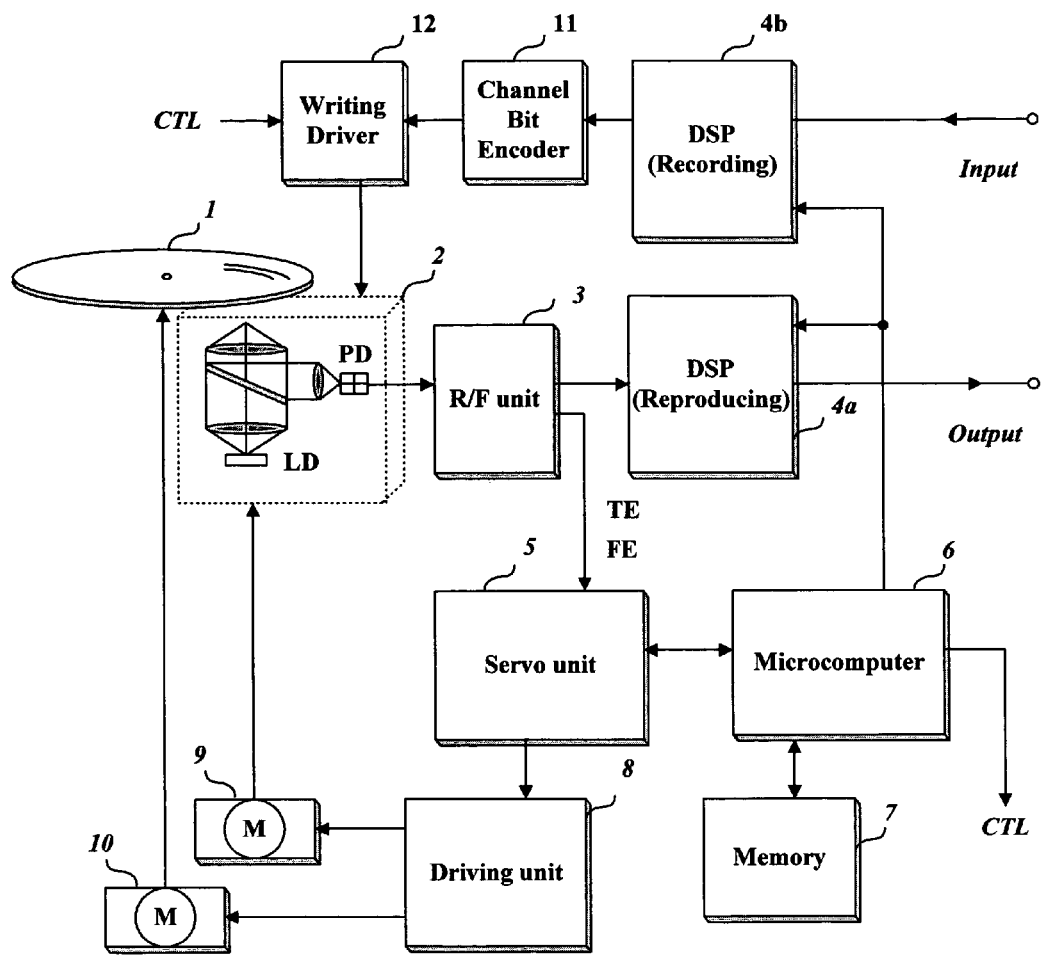
FIG. 1 is a simplified block diagram of a conventional optical disk device for recording and reproducing data to/from a writable disk.
Figure 2:
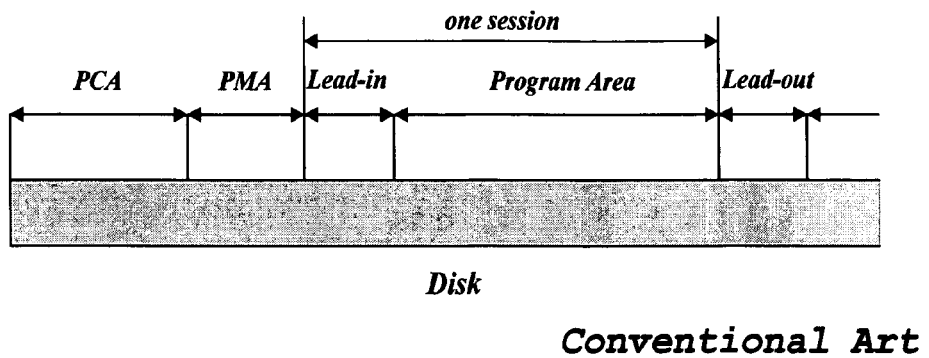
FIGS. 2 and 3 depict an example of a recording area format and an example of recorded data for an once-recordable disk CD-R or a rewritable disk CD-RW.
Figure 3:
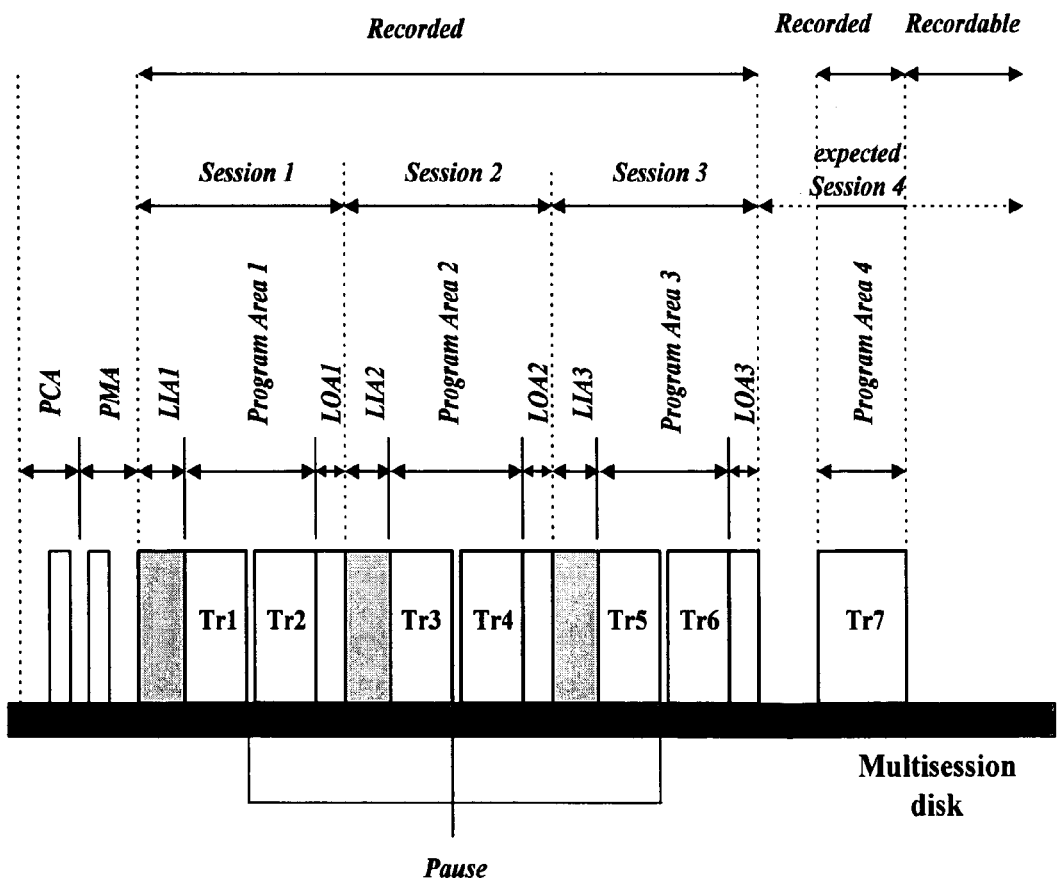
Figure 4:
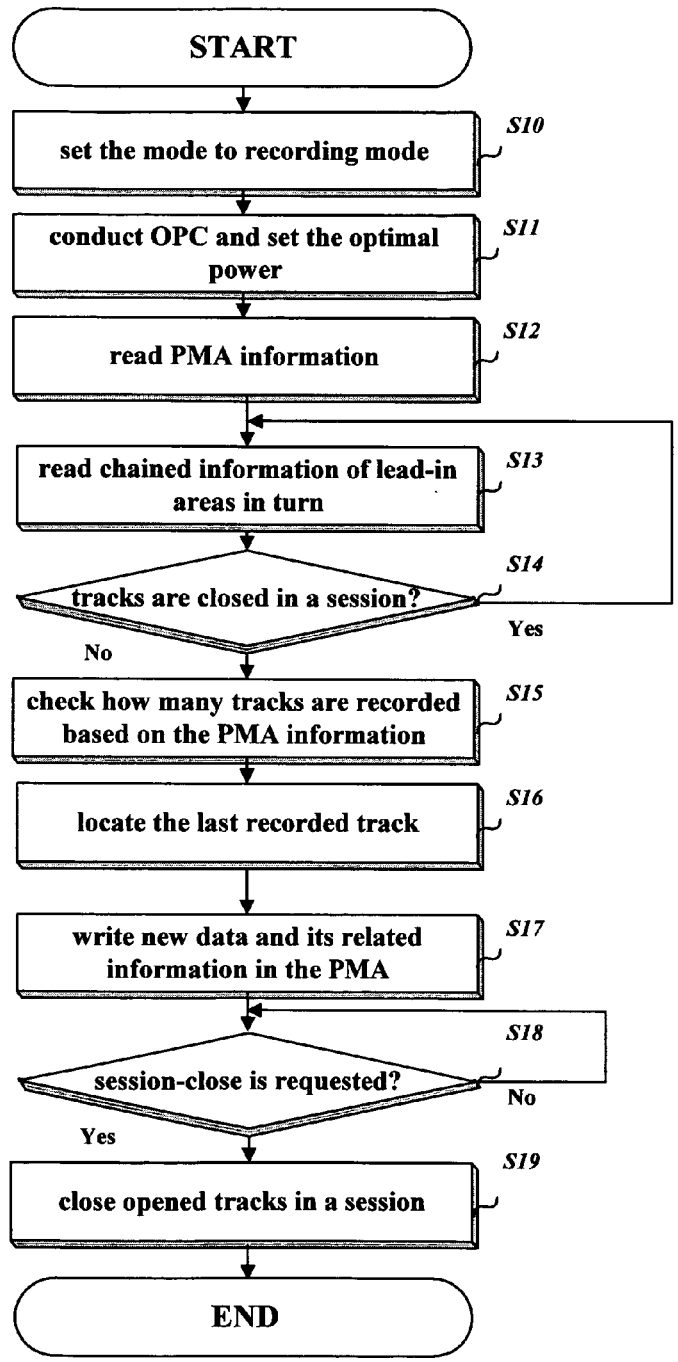
FIG. 4 is a flow chart illustrating a general process of writing new data adjacently to previously-recorded data.
Figure 5:
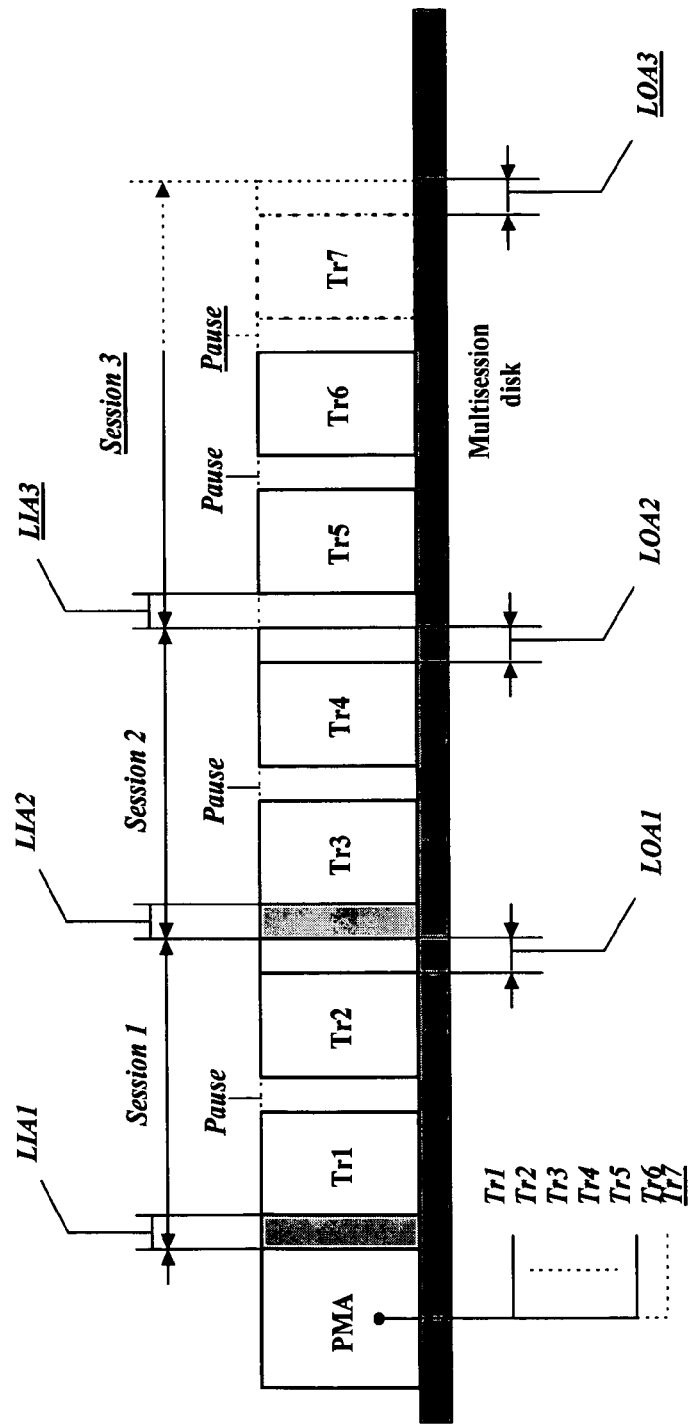
FIG. 5 describes an example of recorded data of a writable disk and a recording procedure for the disk.
Figure 6:
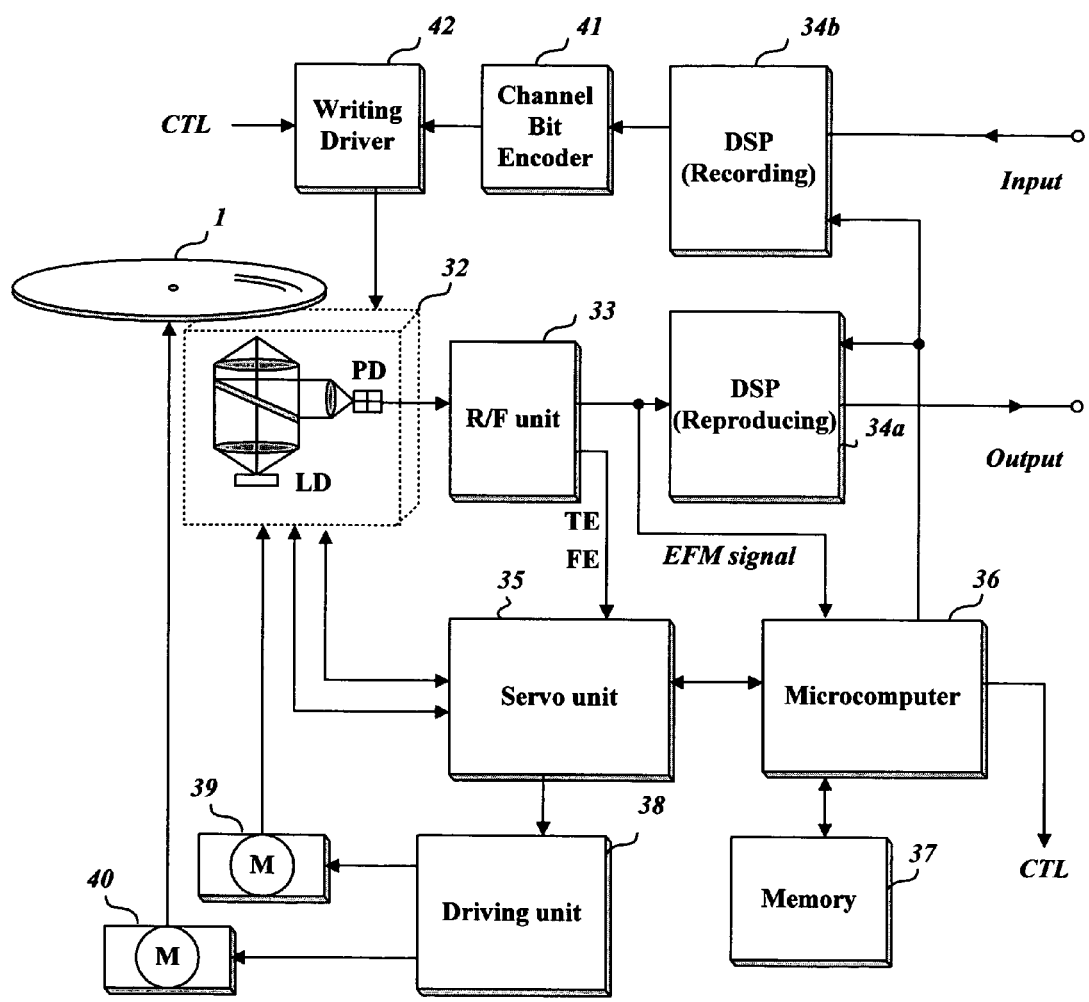
FIG. 6 is a block diagram of an optical disk device to which a recordable position determining method according to the present invention is applied.

FIG. 6 is a block diagram of an optical disk device to which a recordable position determining method according to the present invention is applied. The disk device of FIG. 6 comprises a digital recording signal processor 34b for converting input data into recording-formatted data by adding additional data such as error correction codes, a channel bit encoder 41 for converting the recording-formatted data into EFM-formatted bit stream, a writing driver 42 for yielding a writing current according to an input bit stream, an optical pickup 32 for recording signals corresponding to the writing current onto an optical disk 1 and reproducing recorded signals from the optical disk 1, an R/F unit 33 for yielding servo error signals TE and FE, and binary signals through combining the reproduced signals from the disk 1, a digital reproducing signal processor 34a for restoring original data from the binary signals, a sled motor 39 for moving the pickup 32 radially, a spindle motor 40 for rotating the disk 1, a driving unit 38 for driving the motors 39 and 40, a servo unit 35 for controlling the driving unit 38 and the pickup 32 based on the servo error signals TE and FE, a microcomputer 36 for controlling the overall operation of the servo unit 35 and the digital signal processors 34a and 34b, and the writing driver 42 in order to record and reproduce data, and checking the reproduced EFM-formatted binary signal from the R/F unit 33 to know whether or not a corresponding area has recorded data, and a memory 37 for storing data for the microcomputer 36 to use for supervising operations. All these components are operatively coupled.

Figure 7:
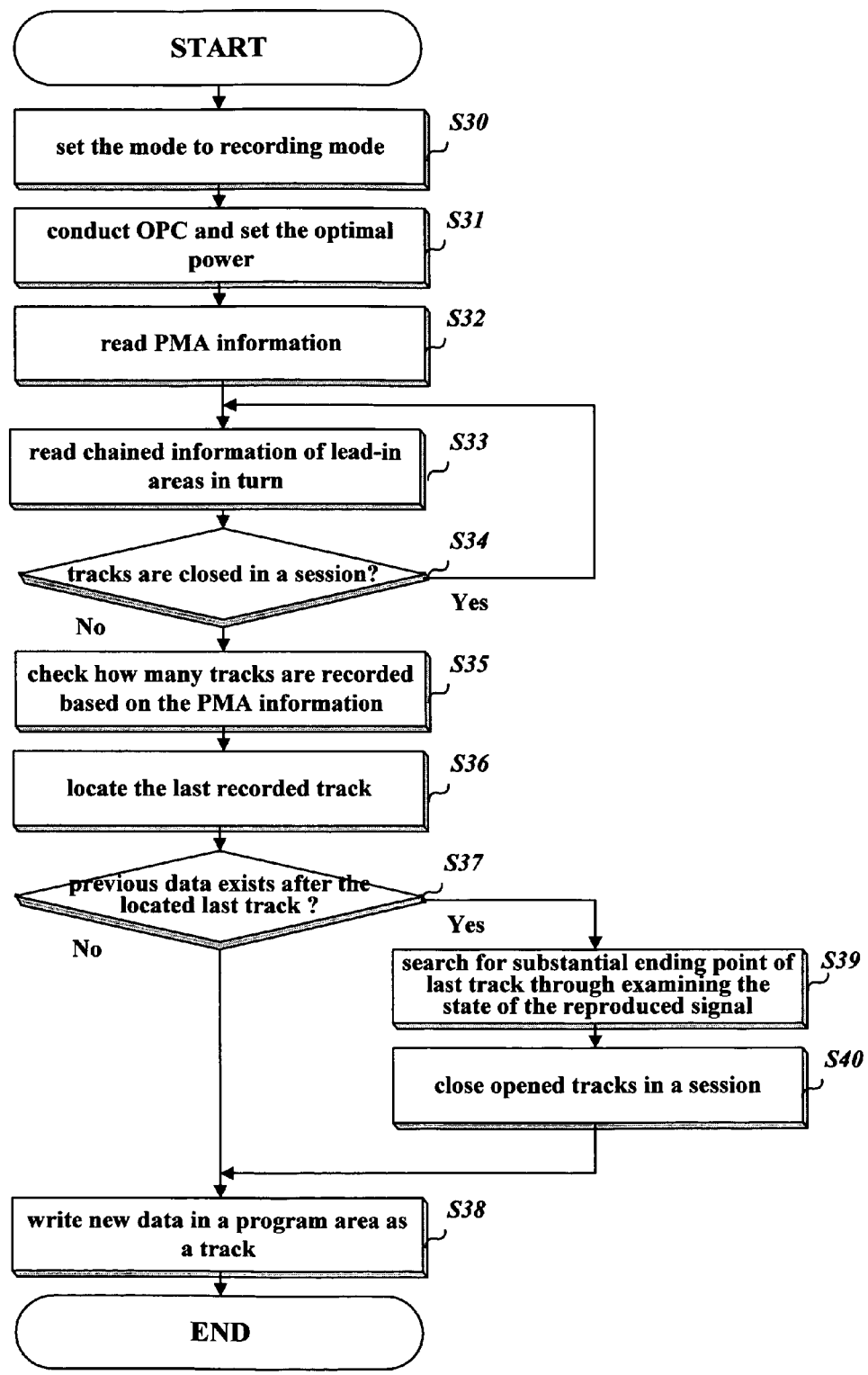
FIG. 7 is a flow chart illustrating a method of determining a recordable position of a writable disk according to the present invention.

FIG. 7 is a flow chart of a method of determining an actual recordable position of a writable disk according to the present invention. The method of FIG. 7 embodying the present invention to be conducted by the disk device of FIG. 6 is described in detail.

When a user requests new data to be recorded in an inserted disk 1, the microcomputer 36 sets its mode to a recording mode (S30), conducts an optimal power calibration (OPC), and sets the optimal writing power determined through the OPC into the writing driver 32 (S31).

After the OPC, the microcomputer 36 reads position and size information, which is recorded in the PMA, about recorded tracks (S32), and searches for the first lead-in area, the second lead-in area, and the third lead-in area so forth, in turn based on the PMA information and chained information between the lead-in areas of the disk 1 (S33).

Figure 8:
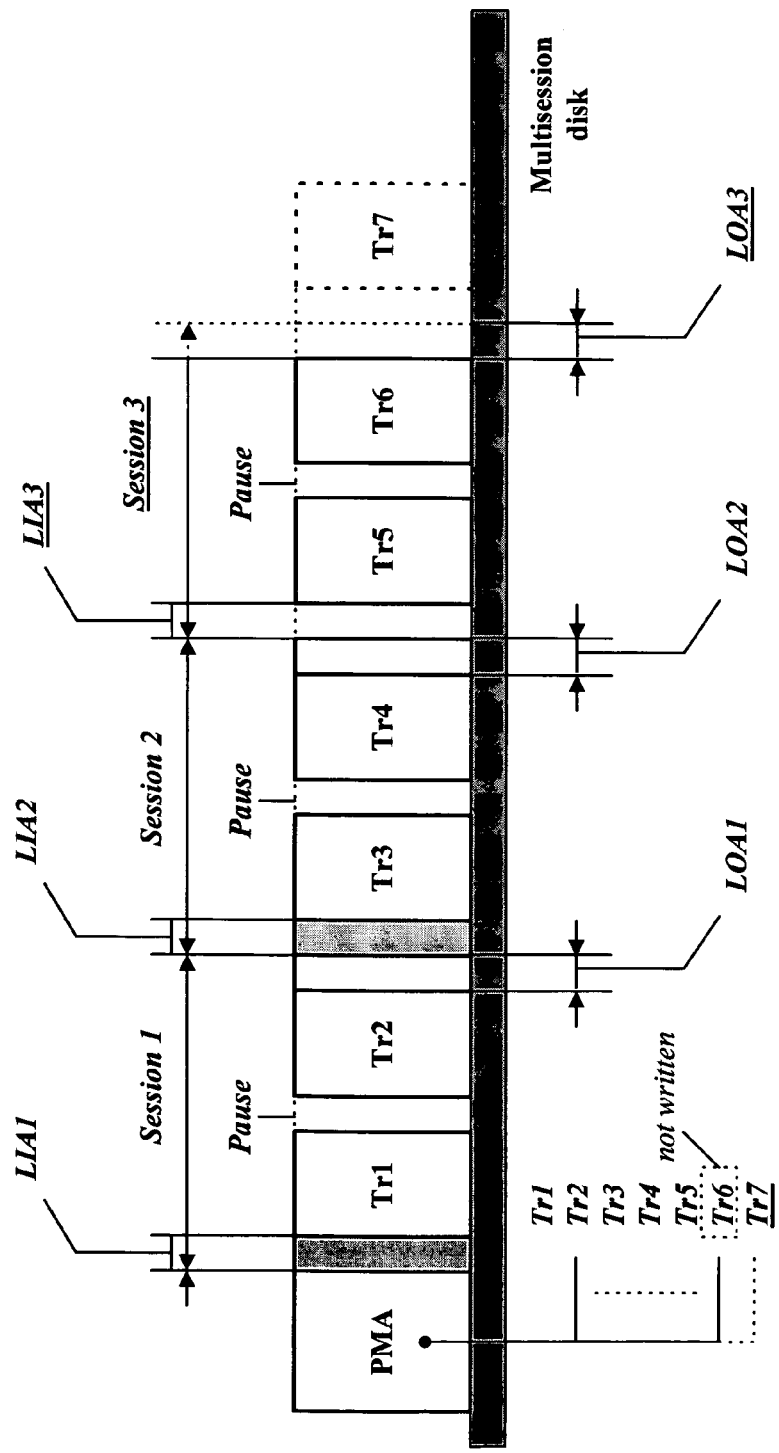
FIG. 8 describes an example of recorded data and a recording procedure according to the present invention.

For example, suppose that tracks 1 and 2 belong to the first closed session, tracks 3 and 4 belong to the second closed session, and tracks 5 and 6 are recorded next to the second closed session as shown in FIG. 8. The microcomputer 36 reads out position information of the second lead-in area 'LIA2' from the first lead-in area 'LIA1', and knows the next recording position, that is, the position of track 5, from reading the second lead-in area 'LIA2'. Since the program area containing tracks 5 and 6 is not closed into a session (S34), the microcomputer 36 examines the PMA information to know how many tracks are recorded on the disk 1 and locates a final recorded track based on the PMA information (S35).

However, if the PMA has wrong information on the position and size about track 6 or has no such information since a servo control malfunctioned due to an external shock or a data buffer was underrun during recording on track 6, the microcomputer 36 considers track 5, which was recorded properly, as the last recorded track based on the PMA information although track 6 has been formed on the disk 1 due to its partial recording.

To prepare for such an abnormal case, the microcomputer 36 does not write new data next to track 5. Instead, the microcomputer 36 controls the pickup 32 to reproduce from the ending point of track 5 to a certain extent. Then, the microcomputer 36 checks whether the signals outputted from the R/F unit 33 are EFM-formatted binary signals (S37). If the output is a binary signal of which state is toggled, the area following track 5 is not blank; but if not, it is blank.

If the area following track 5 is blank, the microcomputer 36 returns the pickup 32 to the position, which is separated from the ending point of track 5 by a pause section, and controls the pickup 32 to write new data from that new position. However, if it is determined that the area following track 5 has pre-recorded data, the microcomputer 36 continues to check the reproduced signals until it is changed to constant, that is, not binary. So that, when the transition point at which the reproduced signal is changed from binary to constant is detected, the microcomputer 36 recognizes the transition point as the actual last point of recorded data belonging to uncompleted track 6 (S39).

After that, the microcomputer 36 closes track 5 and uncompleted track 6 into a session by writing necessary information in the lead-in area 'LIA3' and the lead-out area 'LOA3' after securing the lead-out area 'LOA3' (S40), and it controls new data to be written in a program area as track 7 (S38) after the just-closed session, so that the new data is not overwritten onto uncompleted track 6.

Instead of closing track 5 and uncompleted track 6 into a session as above, the microcomputer 36 may secure a pause section just after the found last recording point, and then write new data next to the secured pause section as track 7.

Some time later, if a session-close is requested, the microcomputer 36 closes tracks 5 and 7 and uncompleted track 6 into a session, and writes necessary information in the lead-in 'LIA3' and the lead-out area 'LOA3' after securing the lead-out area 'LOA3'.

With the above-explained writing operation, an uncompleted track can be properly closed into a session and new data is never overwritten onto an uncompleted track even though the PMA information may not accurately reflect information on tracks recorded actually in a program area.

Figure 9:
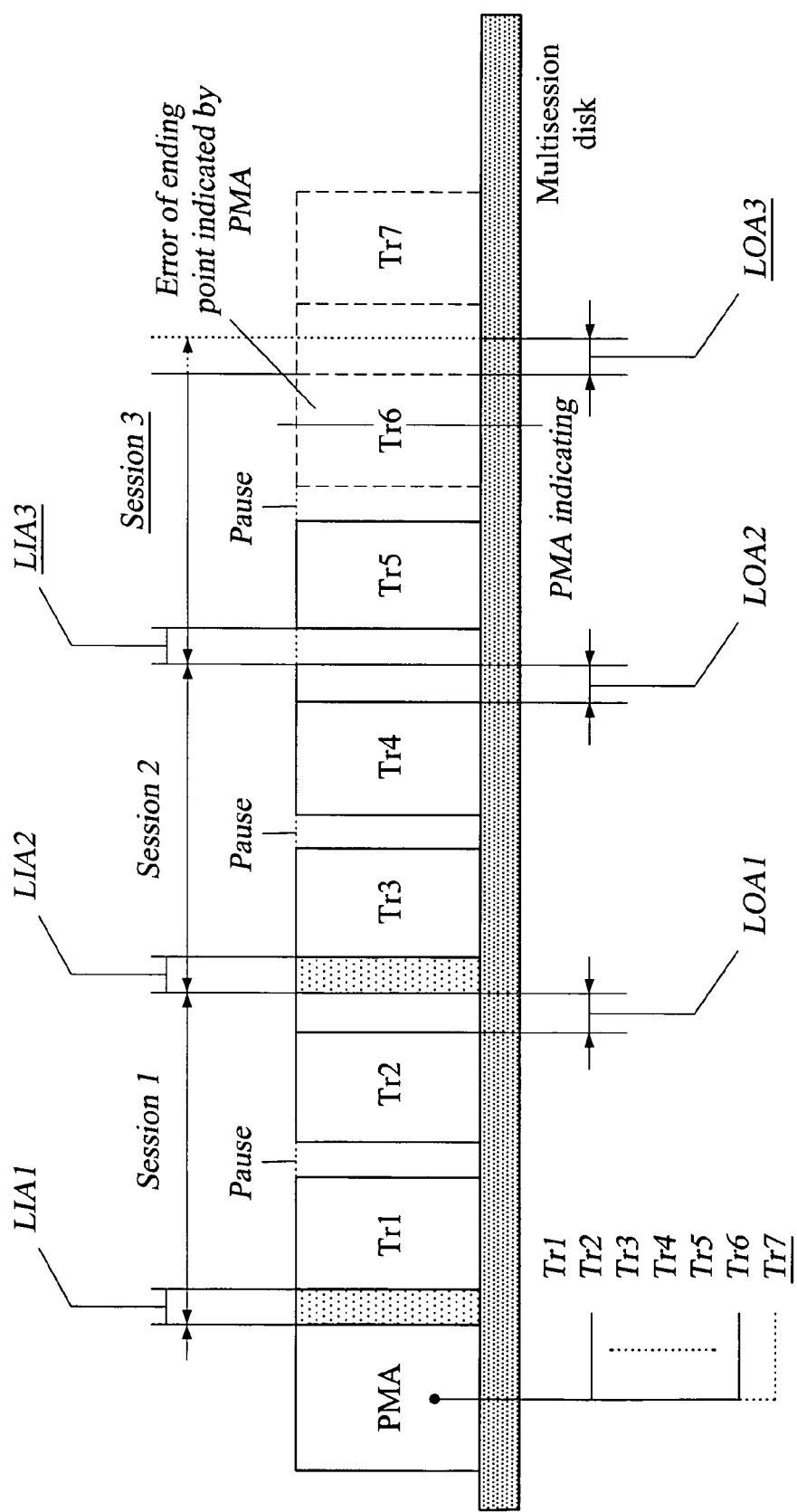
FIG. 9 describes another example of recorded data and a recording procedure according to the present invention.

Another example of recorded data is shown in FIG. 9 in which tracks 1 and 2 belong to the first closed session, tracks 3 and 4 belong to the second closed session, and tracks 5 and 6 are recorded next to the second closed session, and the position and size information about tracks 1 to 6 are written in the PMA. However, the size of the last track 6 written in the PMA is not identical to the size of actually-recorded track 6 because of momentary buffer-underrun, etc. during the recording of track 6.

A data writing method for the case of FIG. 9 is conducted as follows.

As explained above in the flowchart of FIG. 7, when a user requests new data to be recorded in an inserted disk 1, the microcomputer 36 sets its mode to a recording mode, conducts the OPC, and sets an optimal writing power determined through the OPC into the writing driver 32. After the OPC, the microcomputer 36 reads position and size information, which is recorded in the PMA, about recorded tracks, and searches for the first lead-in area, the second lead-in area, and the third lead-in area so forth, in turn based on the PMA information and chained information between the lead-in areas. That is, the microcomputer 36 reads out position information of the second lead-in area 'LIA2' from the first lead-in area 'LIA1', and knows the next recording position, i.e., the position of track 5, from reading the second lead-in area 'LIA2'. Since the program area containing tracks 5 and 6 is not closed into a session, the microcomputer 36 examines the PMA information to know how many tracks are recorded and locates the final recorded track, which will be track 6, based on the PMA information.

To resolve the abnormal case in which the PMA information does not accurately reflect the actual size of actually-recorded track 6 due to momentary buffer underrun etc., the microcomputer 36 does not write new data after the final recording position calculated based on the PMA information. Instead, it controls the pickup 32 to read from the final position for a certain duration. Then, the microcomputer 36 checks whether or not the signal outputted from the R/F unit 33 is an EFM-formatted binary signal. If the output signal is binary, the area following the final recording position is not blank, but if not, it is blank.

In the case that the area is not blank, when the reproduced signal makes a transition from binary to constant, the microcomputer 36 recognizes the transition point as a substantial last point of track 6, and closes an area from the starting point of track 5 to the recognized last point into a session and writing necessary information in the lead-in area 'LIA3' and the lead-out area 'LOA3' after securing the lead-out area 'LOA3'.

After that, the microcomputer 36 controls and writes new data in a program area as track 7 after the just-closed session, so that the new data is never overlapped partially with track 6 of which recorded size is not identical to the size information of the PMA.

Figure 10:
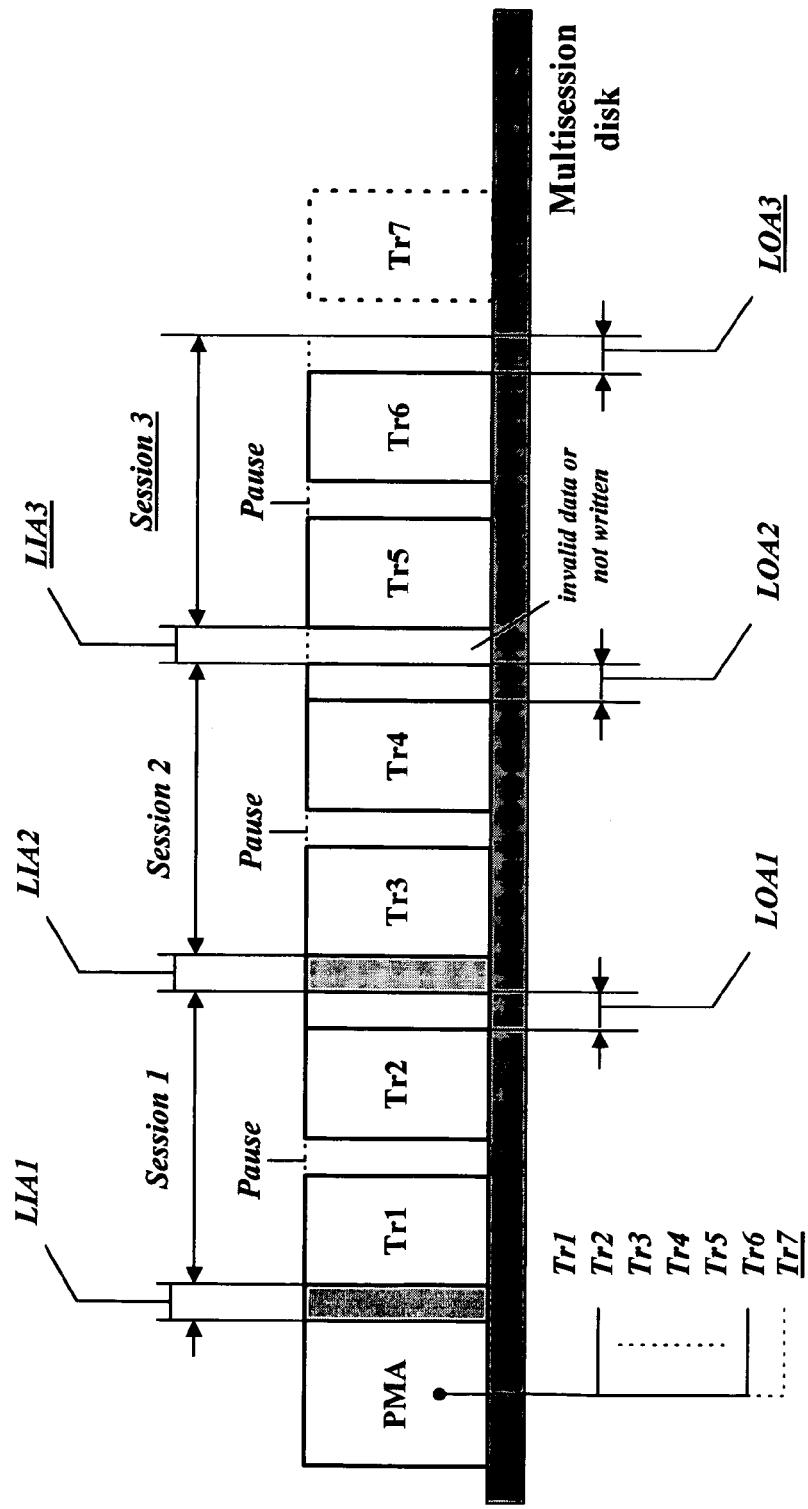
FIG. 10 describes another example of recorded data and a recording procedure according to the present invention.

Another example of recorded data is shown in FIG. 10 in which tracks 1 and 2 belong to the first closed session, tracks 3 and 4 to the second closed session, and tracks 5 and 6 to the third session, and the position and size information about tracks 1 to 6 are normally written in the PMA. However, the third lead-in area (LIA3) has wrong information on the next recording position or does not have such information because of a mechanical shock or a buffer-underrun, etc. occurred during the closing of the third session. A data writing method for the case of FIG. 10 is discussed as follows.

As explained above in the procedure of FIG. 7, when a user requests new data to be recorded in an inserted disk 1, the microcomputer 36 sets its mode to a recording mode, conducts the OPC, and sets an optimal writing power determined through the OPC into the writing driver 32. After the OPC, the microcomputer 36 reads out position information of the second lead-in area 'LIA2' from the first lead-in area 'LIA1', reads out position information of the third lead-in area 'LIA3' from the second lead-in area 'LIA2', and tries to read out the next recording position for new data from the third lead-in area 'LIA3'.

However, the reading of the third lead-in area 'LIA3' may fail due to an abnormal recorded state which was made from a servo or writing failure caused by a mechanical shock, etc. In such case, the microcomputer 36 controls the pickup 32 to reproduce from the starting point of the third program area next to the lead-in area 'LIA3', and checks whether the signal outputted from the R/F unit 33 is changed from EFM-formatted binary signal to a constant signal. If the output signal is changed from binary to constant and the constant level is maintained for more than a pause period, the microcomputer 36 considers the changed position as an ending position of track 6, i.e., the last track of the uncompleted session 3 and thereby knows the next actual recordable position.

Then, after detecting the actual recordable position, the microcomputer 36 secures the fourth lead-in area 'LIA4', and then controls and records new data in a program area as track 7 (S38) after the secured lead-in area 'LIA4'.

With the above-explained writing operation, new data is properly written in a blank area following the uncompleted session 3 even though the lead-in area of the uncompleted session 3 has abnormal data or has no position information on the next recordable position.

Figure 11:
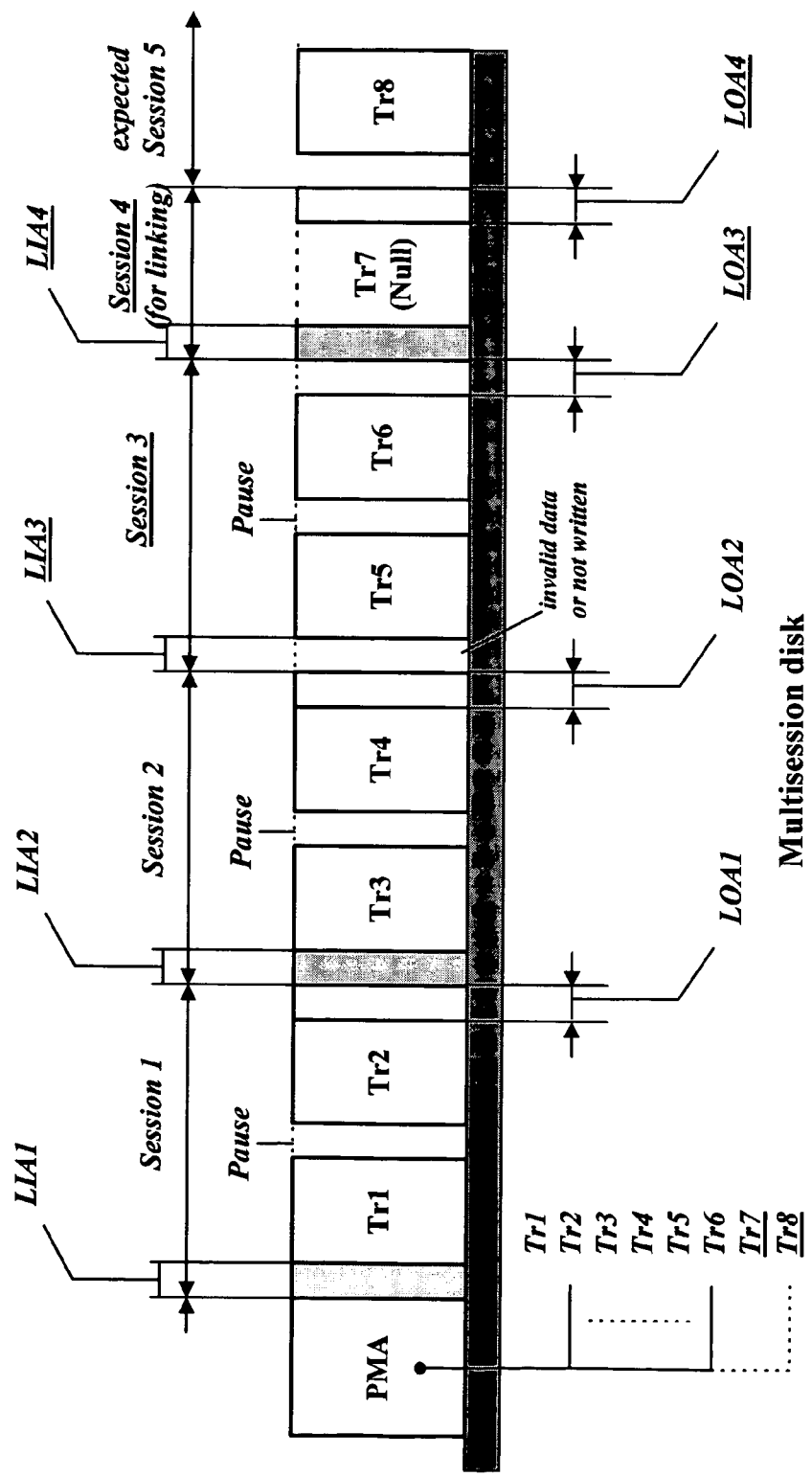
FIG. 11 describes another example of recorded data and a recording procedure according to the present invention.

In the above case that a lead-in area is invalid, a linking session may be created as shown in FIG. 11. The linking session contains one track of null data, a lead-in area whose information points to the next recording position, that is, a lead-in area of new session 5 for new data, and a lead-out area.

Therefore, the lead-in areas containing tracks which are recorded and closed in sessions normally are linked after the null session.

In the explained cases that the size of a track written in the PMA is not identical to the size of an actually-recorded track and that a lead-in area has wrong or no position information on the next recordable position, the microcomputer 36 may inform a user of the abnormal condition by outputting an advisory message, and correct wrong information, if it is rewritable and correctable, according to the request of a user.

The method and apparatus for determining a recordable position of a writable disk according to the present invention, enable new data not to be written over previous data of which recording was interrupted by a servo or writing failure caused from a mechanical shock, etc. This allows new data to be recorded properly as well as prevents previously written data from being damaged or lost.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for recording and reproducing to and from a writable disk, comprising:
    a pickup writing input data and reading the written data to/from the writable disk;
    a moving unit moving the pickup across the writable disk; and
    a controller controlling the moving unit to move the pickup to a recordable position indicated by data recording information which was updated after a previous data recording, checking whether or not data has been recorded in an area following the indicated recordable position by examining the state of a recording surface state of the writable disk, and changing the recordable position for new data to another position based on the checked result, wherein the controller controls the pickup to write data necessary to close recorded data into a session if data has been recorded in said area following the indicated recordable position.

2. The apparatus set forth in claim 1, wherein the controller determines whether data has been recorded in said area following the indicated recordable position based on whether or not a binary signal modulated is detected.

3. The apparatus set forth in claim 1, wherein the data recording information is provided in a lead-in area of the disk.

4. A method for recording and reproducing to and from a writable disk, comprising:
    (a) moving a pickup to a recordable position indicated by data recording information which was updated after a previous data recording;
    (b) checking whether or not data has been recorded in an area following the indicated recordable position by examining the state of a recording surface state of the writable disk; and
    (c) changing the recordable position for new data to another position based on the result of the step (b), and writing data necessary to close recorded data into a session if data has been recorded in said area following the indicated recordable position based on the result of the step (b).

5. The method of claim 4, wherein the step (b) determines whether data has been recorded in said area following the indicated recordable position based on whether or not a binary signal modulated is detected.

6. The method of claim 4, wherein the data recording information is provided in a lead-in area of the disk, so that the step (a) moves the pickup to the lead-in area to read the data recording information before moving the pickup to the recordable position.

7. The method of claim 4, wherein the data recording information is provided in each lead-in area of each session of the disk, wherein the step (a) moves the pickup sequentially to each lead-in area to read each data recording information before moving the pickup to the recordable position.

* * * * *